United States Patent Office 3,410,623
Patented Nov. 12, 1968

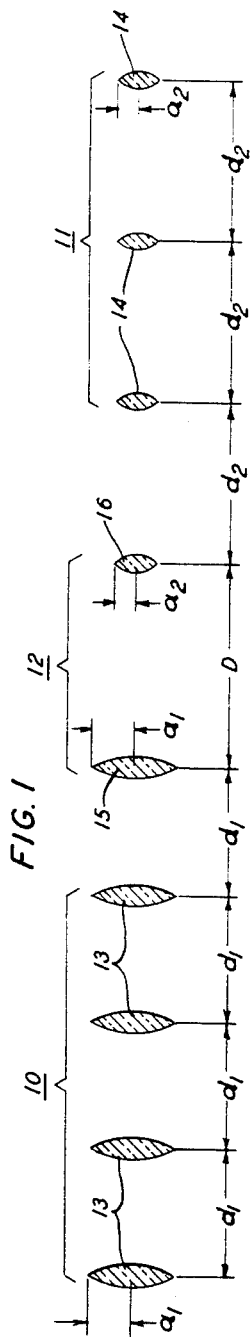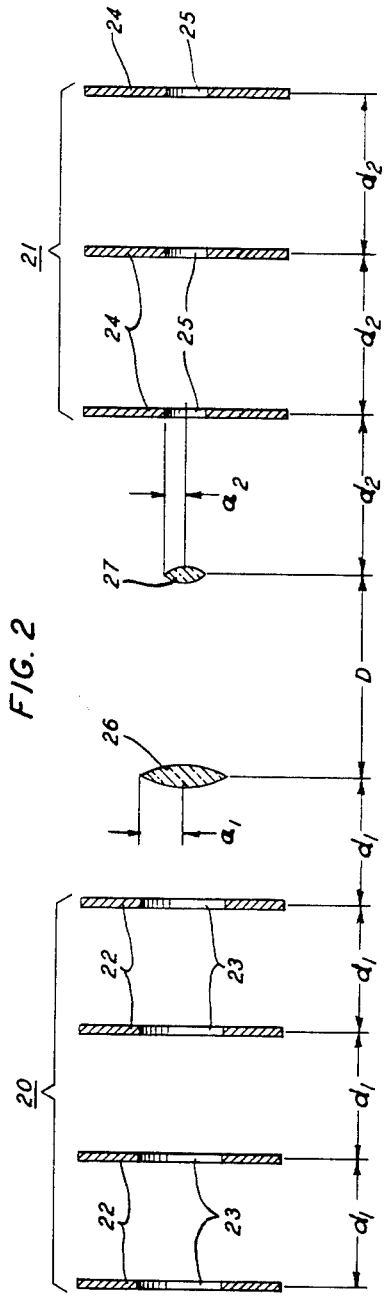
FIG. 1
FIG. 2
INVENTOR
H. W. KOGELNIK
BY
ATTORNEY

3,410,623
TRANSITION SECTION FOR BEAM WAVEGUIDES USING APERTURE-LIMITED LENSES
Herwig W. Kogelnik, Summit, N.J., assignor to Bell Telephone Laboratories, Incorporated, New York, N.Y., a corporation of New York
Filed Mar. 9, 1965, Ser. No. 438,297
4 Claims. (Cl. 350—96)

ABSTRACT OF THE DISCLOSURE

This application describes a transition section, comprising two aperture-limited lenses, for coupling optical wave energy between two dissimilar beam waveguides which have similar mode patterns. By suitably spacing the lenses and selecting their focal lengths, the mode pattern of one guide can be scaled to match the mode pattern of the other guide. Under these conditions, no mode conversion takes place at the transition, and the iterative loss is the same for each lens in the structure.

---

This invention relates to transition sections for coupling electromagnetic wave energy of very short wavelengths between dissimilar beam waveguides.

With the advent of the laser as a means for generating coherent wave energy in the infrared, visible and ultraviolet portions of the frequency spectrum, to be referred to hereinafter collectively as "optical" waves, there has arisen concurrently a need for guiding means for the long distance transmission of such wave energy.

In an article entitled "Experimental Studies on a Beam Waveguide for Millimeter Waves," published in the May 1961 issue of the Institute of Radio Engineers Transactions on Antennas and Propagation, pp. 252–263, J. R. Christian and G. Goubau describe a so-called "beam" waveguide for propagating millimeter waves. A beam waveguide of this general type can also be used at optical frequencies, as indicated by A. G. Fox and T. Li in their paper entitled "Resonant Modes in a Maser Interferometer," published in the March 1961 issue of the Bell System Technical Journal. (Also see the paper entitled "Confocal Multimode Resonators for Millimeter Through Optical Wavelength Masers," by G. D. Boyd and J. P. Gordon published in the same issue.)

In its simplest form a beam waveguide comprises a plurality of uniformly spaced irises through which the wave energy propagates. The propagation characteristics of the waveguide are a function of the iris radii, the iris-to-iris spacing and the wavelength of the wave energy.

More generally, however, the beam waveguide consists of a sequence of aperture-limited lenses. The propagation characteristics of the lens beam waveguide are also a function of the focal length of the lenses.

While the lens and the iris beam waveguides are referred to separately and are discussed separately in the detailed description contained hereinbelow, it should be noted that the iris waveguide can be regarded for present purposes as a special lens waveguide in which the focal length of the "lens" is infinite.

As an optical waveguide is typically much larger in cross-sectional dimensions than the wavelength of the wave energy propagating therein, it is capable of supporting many higher order modes. In an ideal system in which the waveguide is perfectly uniform, the wave energy would propagate undisturbed. However, it is recognized that in any practical transmission system it is generally necessary, for various reasons, to change guide sizes. For example, straight sections of waveguide, extending over long distances are preferably made of large diameter waveguide to minimize diffraction losses. On the other hand, curves are more efficiently negotiated by smaller diameter waveguide. Thus, it is apparent that any practical transmission system will afford ample opportunity to disturb the propagation of the wave energy unless appropriate means are provided to match the mode patterns of the two dissimilar waveguides. In the absence of such matching of the mode patterns, conversion of the wave energy from the desired modes to other spurious and undesired modes occurs with an accompanying loss of power.

It is accordingly an object of the present invention to transfer wave energy between two dissimilar beam waveguides with minimal mode conversion.

In accordance with the present invention, the parameters of the dissimilar waveguides are selected so that their mode patterns are similar. A transition section, comprising a series of lenses, is designed to couple these dissimilar waveguides by scaling the mode pattern of each waveguide so as to match the mode pattern of the other guide.

In a first embodiment of the invention, a two-lens transition section for coupling a pair of dissimilar aperture-limited lens, beam waveguides is described. In a second illustrative embodiment of the invention, a two-lens transition section is used to couple dissimilar iris beam waveguides. More generally, however, a transition section in accordance with the invention can be used to couple any two dissimilar wave supporting structures whose mode patterns are scaled versions of each other.

For large aperture changes it may be advantageous to use additional lenses in the transition section. Accordingly, a three-lens illustrative embodiment of the invention is also described.

These and other objects and advantages, the nature of the present invention, and its various features, will appear more fully upon consideration of the various illustrative embodiments now to be described in detail in connection with the accompanying drawings, in which:

FIG. 1 shows a transition section, in accordance with the present invention, for coupling two dissimilar aperture-limited lens beam waveguides;

FIG. 2 shows a transition section used to couple two dissimilar iris beam waveguides;

Figure 3:
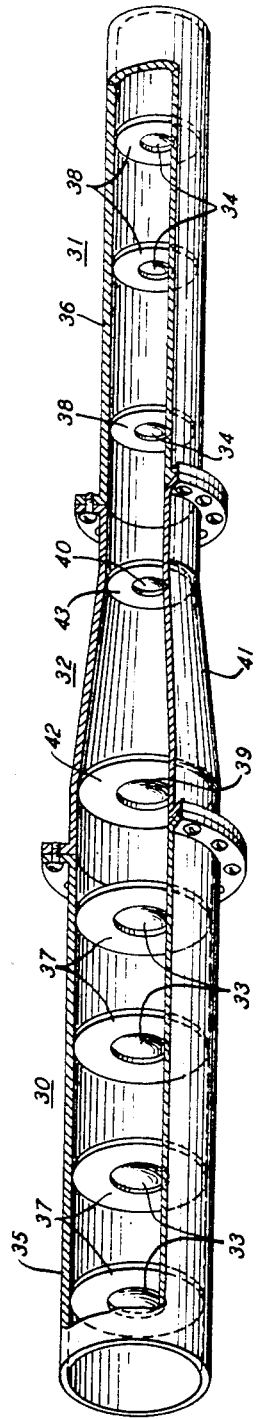
FIG. 3 shows, in perspective, an optical transmission path including two dissimilar beam waveguides coupled together by means of a two-lens transition section.

Referring to FIG. 1, there is shown a beam wave transmission system comprising two dissimilar beam waveguides 10 and 11 coupled together by means of a transition section 12.

Beam waveguide 10 comprises a plurality of substantially identical, equally spaced aperture-limited lenses 13. Each of the lenses has a focal length $f_1$ and an effective aperture radius $a_1$. The lens-to-lens spacing is equal to $d_1$. Similarly, waveguide 11 comprises a plurality of substantially identical, equally spaced aperture-limited lenses 14, each of which has a focal length $f_2$, and an effective aperture radius $a_2$. The lens-to-lens spacing for waveguide 11 is $d_2$.

Coupling between the two dissimilar waveguides 10 and 11 is effected by means of the transition section 12. In accordance with the invention, one embodiment of transition section 12 comprises two lenses, 15 and 16, of focal lengths $F_1$ and $F_2$, respectively. Lens 15, adjacent to waveguide 10, has the same aperture radius $a_1$ as the lenses 13 in waveguide 10 have, and is located a distance $d_1$, equal to the lens-to-lens spacing in waveguide 10, from the last, or terminal, lens in this guide.

Lens 16, adjacent to waveguide 11, has the same aperture radius $a_2$ as lenses 14 have, and is spaced a distance $d_2$, equal to the lens-to-lens spacing in waveguide 11, from the terminal lens in guide 11. The distance between the two transition lenses 15 and 16 is given as D.

The centers of the lenses are preferably located along a common longitudinal axis.

While the lenses 13 and 14, and the lenses in the transition section are illustrated as conventional glass lenses, it should be understood that the invention is not limited to any particular type of lens. That is, the lenses can be made of either glass or plastic material or, alternatively, they can be gas lenses of the type described by D. W. Berreman and S. E. Miller in their copending application Ser. No. 379,175, filed June 30, 1964 and assigned to applicant's assignee.

Wave energy applied to a beam waveguide of the type described above, is focused by each of the lenses and a reiterative mode pattern is established. Wave energy which does not fall within the aperture of the lenses is not focused but is either intercepted and attenuated, or otherwise removed from the useful beam.

The transverse distribution of wave energy established in any beam waveguide is a function of the parameters of the waveguide and, in particular, can be characterized by a Fresnel N number for the waveguide given by $$N = \frac{a^2}{\lambda d} \qquad (1)$$

and the parameter $$G = 1 - \frac{d}{2f} \qquad (2)$$

where $a$ is the aperture radius,
$d$ the lens-to-lens spacing,
$f$ the focal length of the lenses, and
$\lambda$ the wavelength of the wave energy.

If two waveguides are dissimilar in that they have different lens-to-lens spacings, different lens focal lengths and different aperture radii but, nevertheless, have equal parameters N and G, the mode patterns for the two waveguides are similar and scaled in the ratio of the aperture radii.

In accordance with the present invention, the transition section 12 is designed to connect two dissimilar waveguides. The spacing D of the transition lenses 15 and 16, and their focal lengths $F_1$ and $F_2$, are so chosen that essentially no mode conversion takes place at the transition and the iteration loss is the same for each aperture of the system. Aperture diffraction effects are taken into account as these are important in practical beam waveguides having Fresnel numbers of the order of unity and smaller.

In order that no mode conversion takes place in the transition section, the separate waveguides 10 and 11 are first designed to have similar mode patterns. In terms of the parameters of the waveguides, this means that the Fresnel numbers and the G parameters of the two waveguides are made equal. That is, $$N = \frac{a_1^2}{\lambda d_1} = \frac{a_2^2}{\lambda d_2} \qquad (3)$$

and $$G = 1 - \frac{d_1}{df_1} = 1 - \frac{d_2}{2f_2} \qquad (4)$$

When these conditions are fulfilled, the mode patterns of the two waveguides are scaled versions of each other.

It is known that the mode pattern of a beam waveguide is reproduced at each lens aperture. Thus, if lens 15 in the transition section 12 had a focal length $f_1$, equal to that of the lenses 13 in guide 10, the mode pattern of guide 10 would simply be reproduced by lens 15 at a distance $d_1$ from this lens. However, what is sought is a scaled mode pattern. As shown by J. P. Gordon and H. Kogelnik, in their article "Equivalence Relationships among Spherical Mirror Optical Resonators," published in the November 1964 Bell System Technical Journal, pp. 2873–2886, a scaled version of the mode pattern could be produced, but at a different location, by changing the focal length of lens 15 from $f_1$ to some other value. In particular, to exactly match the mode pattern of the second waveguide 11, the mode pattern of waveguide 10 must be scaled by a factor $a_2/a_1$. From the scaling laws given by Gordon et al., the scaled pattern would appear at a distance $$D = d_1 \frac{a_2}{a_1} = d_2 \frac{a_1}{a_2} \qquad (5)$$

from lens 15.

It is, therefore, at this separation that the second transition section lens 16 is located. D, therefore, is the spacing between the transition section lenses 15 and 16.

The focal length of lens 15 to produce this scaling is given by $$\frac{1}{F_1} = \frac{1}{f_1} + \frac{1}{d_1}\left(\frac{a_1}{a_2} - 1\right) \qquad (6)$$

Similarly, to scale the wave pattern of guide 11 to that of guide 10 requires that lens 16 have a focal length given by $$\frac{1}{F_2} = \frac{1}{f_2} + \frac{1}{d_2}\left(\frac{a_2}{a_1} - 1\right) \qquad (7)$$

Equations 5, 6 and 7 are, thus, the design formulae for a transition section in accordance with the described embodiment of the present invention.

For the case of special interest of confocal waveguides, wherein $d_1 = 2f_1$ and $d_2 = 2f_2$, Equations 6 and 7 reduce to $$F_1 = 2f_1 \bigg/ \left(1 + \frac{a_1}{a_2}\right) \qquad (8)$$

and $$F_2 = 2f_2 \bigg/ \left(1 + \frac{a_2}{a_1}\right) \qquad (9)$$

The beam waveguides 10 and 11 in FIG. 1 include lenses of finite focal length at each aperture position. In FIG. 2 there is illustrated a modified beam waveguide in which aperture-limited lenses of infinite focal length (i.e., irises) are used. Thus, in FIG. 2 the first waveguide 20 comprises a plurality of equally spaced, opaque annular members 22, each of which has an aperture 23 of radius $a_1$. Similarly, waveguide 21 comprises a plurality of equally spaced, opaque annular members 24, each of which has an aperture 25 of radius $a_2$. Assuming, as before, that the iris-to-iris spacings $d_1$ and $d_2$ and the aperture radii $a_1$ and $a_2$ are chosen to produce similar mode patterns in the two waveguides, the design formulae for the transition section lenses 26 and 27 are also given by Equations 6, 7 and 8 except that $f_1$ and $f_2$, the aperture focal lengths, are now equal to infinity. Making this substitution, Equations 6 and 7 reduce to $$F_1 = d_1 \bigg/ \left(\frac{a_1}{a_2} - 1\right) \qquad (10)$$

and $$F_2 = d_2 \bigg/ \left(\frac{a_2}{a_1} - 1\right) \qquad (11)$$

FIG. 3 shows, in perspective, an optical transmission path including a section of two dissimilar transmission lines 30 and 31, coupled together by means of a transition section 32. The lenses 33 and 34 in the two waveguides are shown mounted in cylindrical pipes 35 and 36, respectively, by means of annular members 37 and 38. The inner surfaces of pipes 35 and 36 are preferably darkened to absorb the wave energy not focused by the lenses.

In general, however, the pipes and the annular members support and protect the lenses, but play no substantial part in defining the transmission characteristics of the waveguides. These characteristics are basically defined by the properties and spacings of the lenses as explained hereinabove.

Transition section 32 comprises the two lenses 39 and 40 supported in a conical section of pipe 41 by means of the annular members 42 and 43.

As explained above, by omitting the lenses 33 and 34, waveguides 30 and 31 can be converted from aperture-limited lens beam waveguides to iris beam waveguides.

Figure 4:
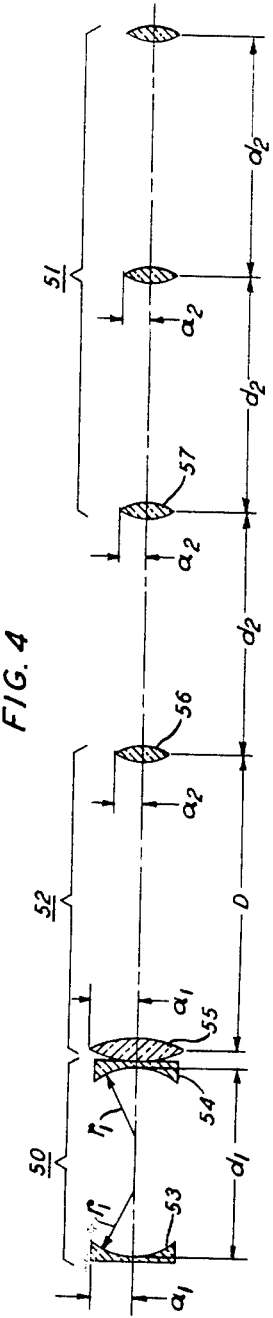
FIG. 4 shows a two-lens transition section used to couple a cavity resonator to a beam waveguide.

Recognizing that a cavity resonator, such as is used in a laser, is the equivalent of a series of equally spaced lenses, a transition section in accordance with the teachings of the present invention, can be used to couple a cavity resonator to a beam waveguide. Such an arrangement is illustrated in FIG. 4, which shows a cavity resonator 50 coupled to a beam waveguide 51 by means of a transition section 52.

Cavity resonator 50 comprises a pair of mirrors 53 and 54 of radius $r_1$ and aperture radius $a_1$, spaced apart a distance $d_1$. As the focal length $f_1$ of each of the mirrors is equal to $r_1/2$, cavity 50 can be considered the equivalent of a beam waveguide comprising a plurality of lenses of focal length $f_1$, aperture radius $a_1$ and lens-to-lense spacing $d_1$.

The design procedure for coupling cavity 50 to beam waveguide 51 is as given hereinabove, with the exception that lens 55 in transition section 52 is located immediately adjacent to one of the cavity mirrors 54 which is partially transmissive. The other lens 56 in transition section 52, however, is spaced a distance $d_2$, equal to the lens-to-lens spacing of guide 51, from the terminal lens 57 of guide 51. The aperture radius of lens 55 is equal to $a_1$, the aperture radius of cavity 50. The aperture radius of lens 56 is $a_2$, equal to the aperture radius of the lenses in guide 51. The focal lengths of lenses 55 and 56 and their spacing D are given by Equations 5, 6 and 7. Advantageously, mirror 54 and lens 55 can be combined into a single, unitary element.

Heretofore, a two-lens transition section has been considered. However, in order to accommodate large changes in guide diameters, the focal lengths of the lenses necessary in a two-lens section become very short. In some instances it may, therefore, become more practical to use three or more transition lenses of longer focal lengths, rather than two lenses having very short focal lengths.

Figure 5:
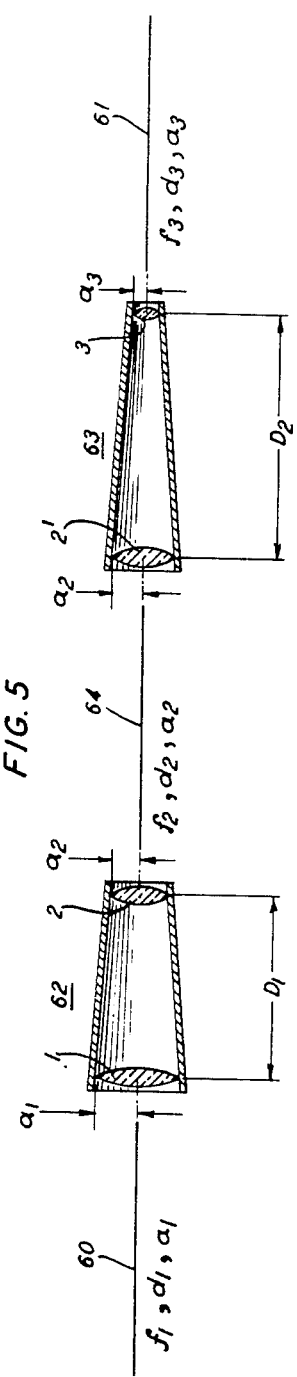
FIG. 5 shows, for purposes of explanation, the use of two, two-lens transition sections.

The design formulae of a three or more lens transition section can be derived by considering the total transition to occur in stages. For example, in FIG. 5, a transition between beam waveguides 60 and 61 is made in two stages by means of two transition sections 62 and 63 connected by an intermediate section of waveguide 64. The guide parameters are indicated for each of the guides 60, 64 and 61 as $(a_1, d_1, f_1)$, $(a_2, d_2, f_2)$ and $(a_3, d_3, f_3)$, respectively.

For similar mode patterns, we have $$N=\frac{a_1^2}{\lambda d_1}=\frac{a_2^2}{\lambda d_2}=\frac{a_3^2}{\lambda d_3} \qquad (12)$$

or $$n=\frac{a_1^2}{d_1}=\frac{a_2^2}{d_2}=\frac{a_3^2}{d_3} \qquad (13)$$

and $$G=1-\frac{d_1}{2f_1}=1-\frac{d_2}{2f_2}=1-\frac{d_3}{2f_3} \qquad (14)$$

or $$g=\frac{d_1}{f_1}=\frac{d_2}{f_2}=\frac{d_3}{f_3} \qquad (15)$$

From Equations 5, 6 and 7 the parameters for each of the transition sections can be computed. For transition section 62

$$D_1=d_1\left(\frac{a_2}{a_1}\right) \qquad (16)$$

The focal lengths of lenses 1 and 2 in transition section 62 are given by $$\frac{1}{F_1}=\frac{1}{f_1}+\frac{1}{d_1}\left(\frac{a_1}{a_2}-1\right) \qquad (17)$$

and $$\frac{1}{F_2}=\frac{1}{f_2}+\frac{1}{d_2}\left(\frac{a_2}{a_1}-1\right) \qquad (18)$$

respectively.

Similarly for transition section 63, $$D_2=d_3\left(\frac{a_2}{a_3}\right) \qquad (19)$$

The focal lengths of lenses 2' and 3 of transition 63 are given by $$\frac{1}{F_2'}=\frac{1}{f_2}+\frac{1}{d_2}\left(\frac{a_2}{a_3}-1\right) \qquad (20)$$

and $$\frac{1}{F_3}=\frac{1}{f_3}+\frac{1}{d_3}\left(\frac{a_3}{a_2}-1\right) \qquad (21)$$

respectively.

Figure 6:
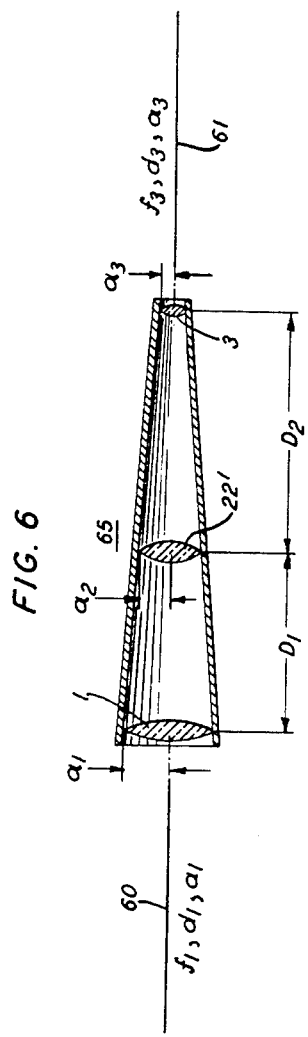
FIG. 6 shows a three-lens transition section equivalent to the two, two-lens sections shown in FIG. 5.

If now the length of the intermediate section of guide is reduced to zero, as illustrated in FIG. 6, lenses 2 and 2', which have the same aperture radius $a_2$, can be combined and replaced by a single lens 22' of focal length $F_{22'}$ given by $$\frac{1}{F_{22'}}=\frac{n}{a_2}\left(\frac{1}{a_1}-\frac{(2-g)}{a_2}+\frac{1}{a_3}\right) \qquad (22)$$

Equations 16, 17, 19 and 22 are, thus, the design formulae for the three-lens transition section 65, in accordance with the present invention.

Since $a_2$, the aperture radius of the center lens, can be arbitrarily selected within the range $a_1>a_2>a_3$, an advantageous selection can be made to produce a linear taper transition section. This can be done by selecting $a_2$ such that $$\frac{a_1-a_2}{D_1}=\frac{a_2-a_3}{D_2} \qquad (23)$$

Solving Equation 23 for $a_2$ in terms of $a_1$ and $a_3$ and combining Equation 23 with Equations 16, 17, 19, 21 and 22 gives, for the linear taper transition section, $$\frac{2}{a_2}=\frac{1}{a_1}+\frac{1}{a_3} \qquad (24)$$

$$D_1=\frac{2d_3}{\left(1+\frac{a_1}{a_3}\right)} \qquad (25)$$

$$D_2=\frac{2d_3}{\left(1+\frac{a_3}{a_1}\right)} \qquad (26)$$

$$\frac{1}{F_1}=\frac{1}{f_1}+\frac{1}{2d_1}\left(\frac{a_1}{a_3}-1\right) \qquad (27)$$

$$\frac{1}{F_3}=\frac{1}{f_3}+\frac{1}{2d_3}\left(\frac{a_3}{a_1}-1\right) \qquad (28)$$

and $$\frac{1}{F_{22'}}=\frac{1}{4}gn\left(\frac{1}{a_1}+\frac{1}{a_3}\right)^2 \qquad (29)$$

It is apparent that by a similar process, the design formulae for a transition taper having four or more lenses can readily be obtained.

It is to be understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An optical wave transmission system comprising two dissimilar lens beam waveguides having similar mode patterns;

and means for coupling said waveguides comprising a pair of lenses of aperture radii and focal lengths $a_1$, $F_1$ and $a_2$, $F_2$ respectively spaced apart a distance D, where $$D = d_1 \left(\frac{a_2}{a_1}\right) = d_2 \left(\frac{a_1}{a_2}\right)$$

$$\frac{1}{F_1} = \frac{1}{f_1} + \frac{1}{d_1}\left(\frac{a_1}{a_2} - 1\right)$$

$$\frac{1}{F_2} = \frac{1}{f_2} + \frac{1}{d_2}\left(\frac{a_2}{a_1} - 1\right)$$

wherein $a_1$ and $a_2$ are the respective aperture radii of the lenses in said two waveguides;
$f_1$ and $f_2$ are the respective focal lengths of the lenses in said two waveguides; and
$d_1$ and $d_2$ are the effective lens-to-lens spacings for said two waveguides.

2. An optical wave transmission system comprising two dissimilar iris beam waveguides having similar mode patterns;

and means for coupling said waveguides comprising a pair of lenses of aperture radii and focal lengths $a_1$, $F_1$ and $a_2$, $F_2$ respectively spaced apart a distance D, where $$D = d_1 \left(\frac{a_2}{a_1}\right) = d_2 \left(\frac{a_1}{a_2}\right)$$

$$F_1 = d_1 \Big/ \left(\frac{a_1}{a_2} - 1\right)$$

$$F_2 = d_2 \Big/ \left(\frac{a_2}{a_1} - 1\right)$$

wherein $a_1$ and $a_2$ are the respective aperture radii of the irises in said two waveguides; and
$d_1$ and $d_2$ are the effective iris-to-iris spacings for said two waveguides.

3. An optical system including a cavity resonator having a pair of spaced mirrors, and a beam waveguide;
said cavity and said waveguide proportioned to have similar mode patterns;
means for coupling said cavity to said waveguide comprising a pair of lenses of aperture radii and focal lengths $a_1$, $F_1$ and $a_2$, $F_2$ respectively spaced apart a distance D, where $$D = d_1 \left(\frac{a_2}{a_1}\right) = d_2 \left(\frac{a_1}{a_2}\right)$$

$$\frac{1}{F_1} = \frac{1}{f_1} + \frac{1}{d_1}\left(\frac{a_1}{a_2} - 1\right)$$

$$\frac{1}{F_2} = \frac{1}{f_2} + \frac{1}{d_2}\left(\frac{a_2}{a_1} - 1\right)$$

wherein $a_1$ is aperture radius of said cavity;
$a_2$ is the aperture radius of said waveguide;
$d_1$ is the distance between cavity mirrors;
$d_2$ is the aperture-to-aperture spacing of said waveguide;
$f_1$ is the focal length of said mirrors; and
$f_2$ is the focal length of the waveguide apertures.

4. An optical wave transmission path including two dissimilar beam waveguides;
the first of said guides comprising a plurality of equally spaced aperture-limited lenses each having a radius $a_1$, focal length $f_1$ and spaced apart a distance $d_1$;
the second of said guides comprising a plurality of equally spaced aperture-limited lenses each having a radius $a_3$, focal length $f_3$ and spaced apart a distance $d_3$, where the parameters $n$ and $g$ for said guides are given by $$n = \frac{a_1^2}{d_1} = \frac{a_3^2}{d_3}$$

and $$g = \frac{d_1}{f_1} = \frac{d_3}{f_3}$$

means for coupling said waveguides comprising first, second and third lenses of radii and focal lengths $a_1$, $F_1$; $a_2$, $F_{22'}$; and $a_3$, $F_3$ respectively;
said lenses disposed between said waveguides in longitudinal succession with the distance $D_1$ between said first and second lenses given by $$D_1 = d_1 \left(\frac{a_2}{a_1}\right)$$

and the distance $D_2$ between said second and third lenses given by $$D_2 = d_3 \left(\frac{a_2}{a_3}\right)$$

and the focal lengths of said lenses are $$\frac{1}{F_1} = \frac{1}{f_1} + \frac{1}{d_1}\left(\frac{a_1}{a_2} - 1\right)$$

$$\frac{1}{F_{22'}} = \frac{n}{a_2}\left[\frac{1}{a_1} - \frac{(2-g)}{a_2} + \frac{1}{a_3}\right]$$

and $$\frac{1}{F_3} = \frac{1}{f_3} + \frac{1}{d_3}\left(\frac{a_3}{a_2} - 1\right)$$

References Cited

UNITED STATES PATENTS

| | | |
|---|---|---|
| 3,101,472 | 8/1963 | Goubau. |
| 3,200,697 | 8/1965 | Goubau _____ 350—96 |
| 3,261,260 | 7/1966 | Strange. |
| 3,352,018 | 11/1967 | Van Heel et al. _____ 350—54 X |

JOHN K. CORBIN, *Primary Exminer.*